United States Patent Office 3,608,353
Patented Sept. 28, 1971

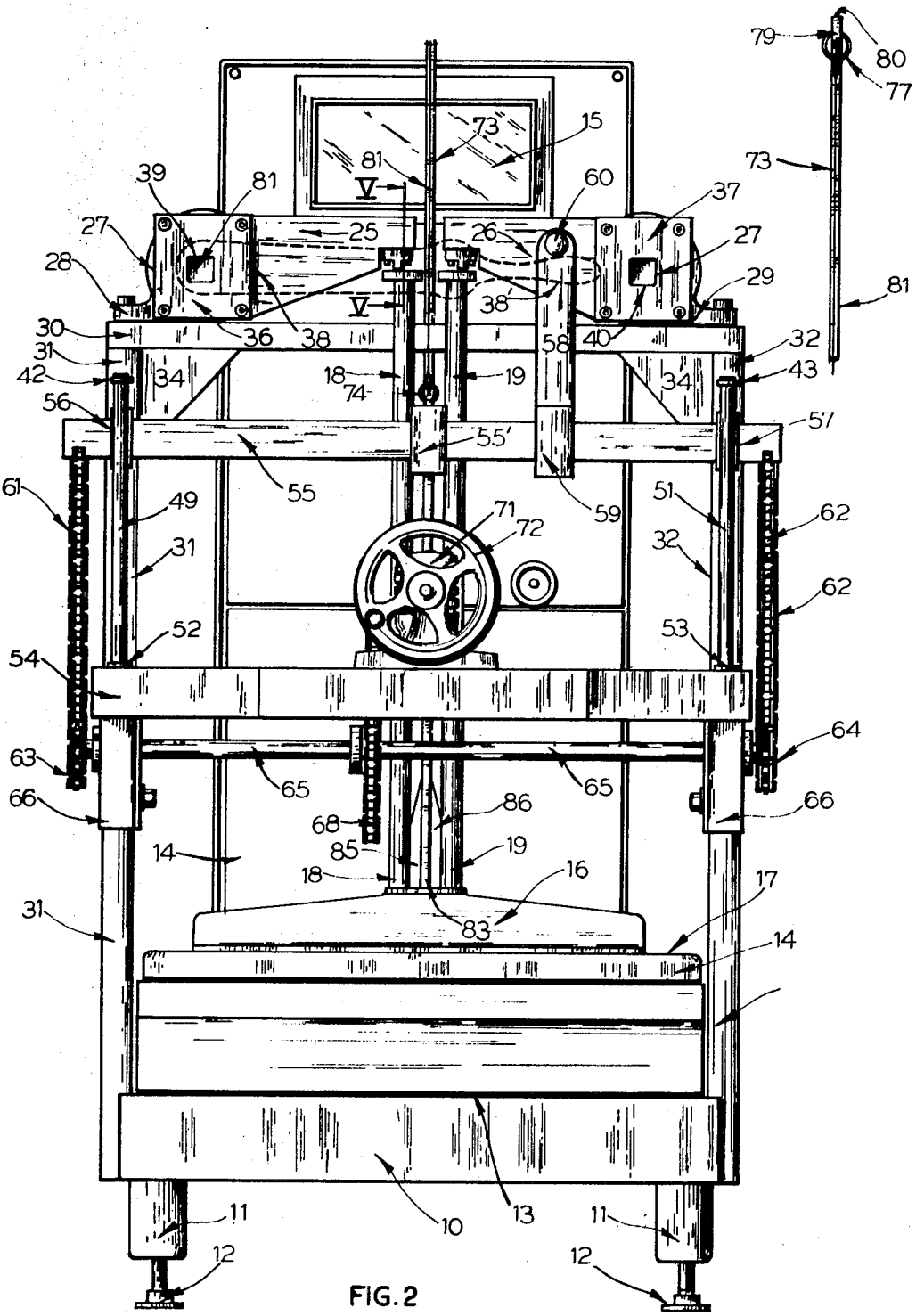

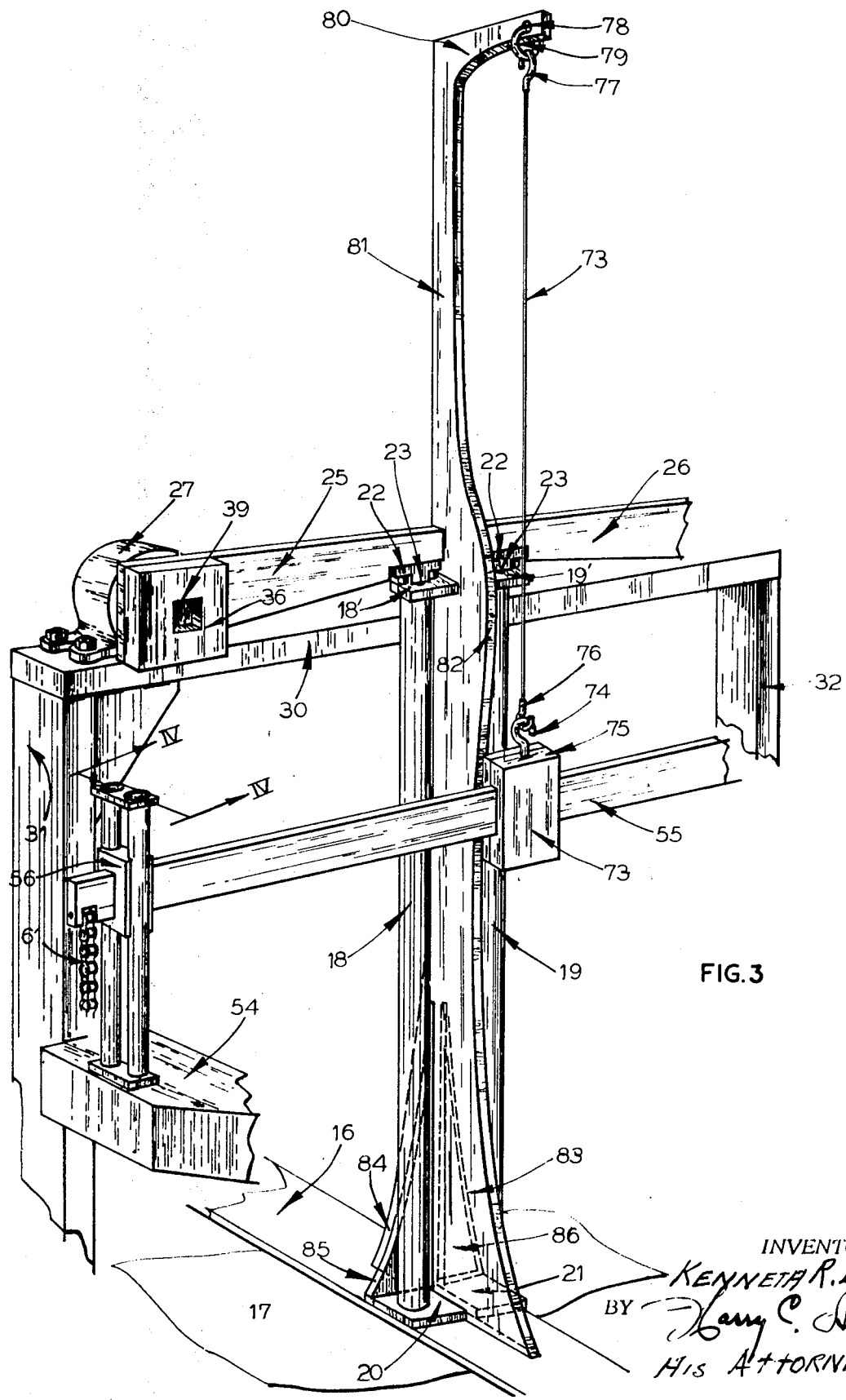

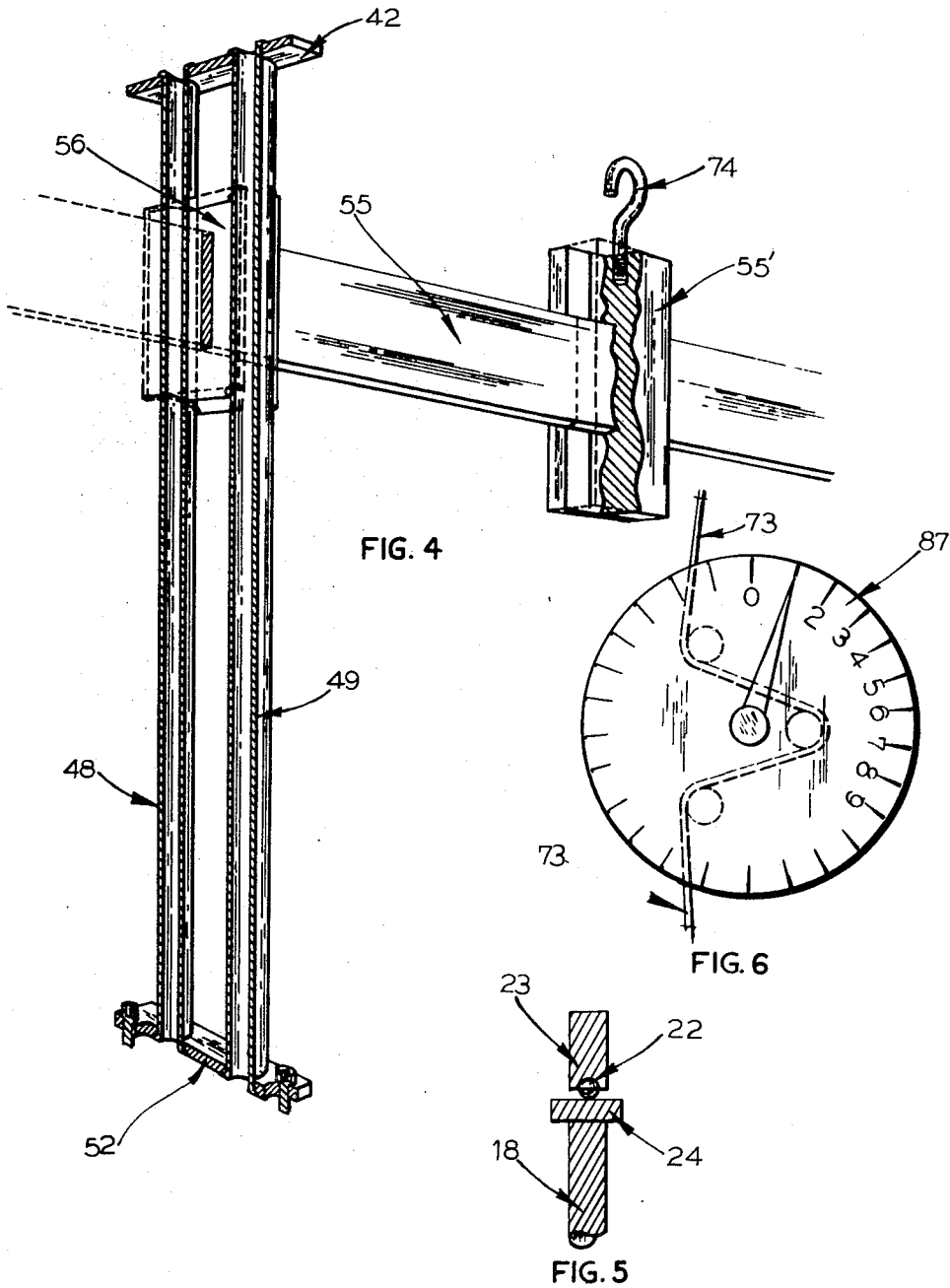

3,608,353
TESTING AND CHECKING DEVICES FOR FORCE MEASURING INSTRUMENTS
Kenneth R. Larson, Des Plaines, Ill., assignor to Snap-On Tools Corporation, Kenosha, Wis.
Filed Nov. 27, 1967, Ser. No. 685,883
Int. Cl. G01l 25/00
U.S. Cl. 73—1C                                    4 Claims

ABSTRACT OF THE DISCLOSURE

Calibrating apparatus for torque wrenches and other force measuring instruments. A framework supports a means for mounting a torque wrench alternately for either clockwise and counterclockwise application of force. A force is transmitted to the torque wrench handle through a gear reduction unit and a sprocket and chain transmission elements. The torque transmitted to the wrench is transmitted through additional linkage to a platform scale for comparison with the torque wrench reading. In addition a steel cable is provided between the force applying and measuring units which can be used for a variety of testing purposes.

---

This invention relates to improved apparatus for measuring tensile and other types of loads as well as for checking the accuracy of measuring devices and more particularly to torque wrench testing apparatus, although it may be employed with equal advantage for other purposes. This invention is an improved testing device of the type shown and described in my Letters Pat. No. 3,255,624 dated June 24, 1966.

It contemplates more especially the provision of instrumentalities in combination with any suitable calibrated apparatus such as an accurate weighing scale, to directly measure loads or adapt measuring devices to be tested such as torque wrenches to respond upon mechanical actuation to the calibrated standard such as a weighing scale so that the load sustained by the device to be tested, will be translated to the weighing scale without introducing any inaccuracies in the translation or movement of the parts.

Most testing devices are rather intricate precision apparatus designed for a limited special purpose, and which is exceedingly expensive and does not lend itself to mass adoption. They are primarily laboratory apparatus of a scientific character that is too sensitive and involved for the average shop attendant to use with any degree of dispatch for directly determining loads of different types and to check devices utilized for applying measured loads. In order to afford adequate testing of measuring devices such as torque wrenches in a factory or repair center where torque wrenches are used in numbers and to enable the average users to test their own measuring tools, as well as to measure tensile strengths of materials, a simple and comparatively inexpensive testing and checking device has been provided which has as its base a standard and easily interpreted weighing scale preferably though not essentially of the platform type. By adapting mechanical actuators for the device to be tested and comparing readings thereon with the reading on an accurate measuring device such as a platform scale to which the load is translated, a fast and dependable check can be made by resort to a simple and comparatively inexpensive checking apparatus. Further, these instrumentalities have been adapted to tensile measuring of elongated materials and members so that their safe tensile load can be easily determined and measured without entailing much time or labor.

One object of the present invention is to provide an improved apparatus for checking the accuracy of measuring devices such as torque wrenches used in increasing numbers in shops, repair centers and on production lines.

Another object is to provide improved load translating device for tensile as well as other load determinations, and to adapt such to the testing of torque wrenches and similar measuring devices to the accurate responses of a platform scale or the like.

Still another object is to provide simple and effective instrumentalities for actuating measuring devices such as torque wrenches and to translate the load imparted thereto for registry with a standard scale to check the accuracy thereof and to enable prompt adjustment should there be any variation.

A further object is to provide a weighing scale measuring expedients with instrumentalities for mounting and actuating torque wrenches and the like thereon and chacking the readings between them to determine the accuracy of the device being checked therewith.

A still further object is to utilize the power advantage of a reduction train of gears in conjunction with load translating instrumentalities for rendering a platform scale or other measuring devices accurately responsive thereto for directly determining tensile or other loads therewith.

Other objects and advantages will appear from the following description of an illustrated embodiment of the present invention.

In the drawings:
FIG. 1 is a perspective view of a structure embodying features of the present invention.

FIG. 2 is a front view in elevation of the device shown in FIG. 1, part of the tensile measuring instrumentalities being broken off and shown detached to enable an enlarged view for clarity of detail.

FIG. 3 is a side view slightly in perspective of the device shown in the preceding figures.

FIG. 4 is an enlarged fragmentary sectional view of the tensile measuring attachment device to determine the tensile load taken substantially along line IV—IV of FIG. 3.

FIG. 5 is a fragmentary sectional view in elevation taken along line V—V of FIG. 2.

FIG. 6 is a front view in elevation of a cable testing tensiometer of standard construction for test use in conjunction with a cable load check and test.

Figure 1:
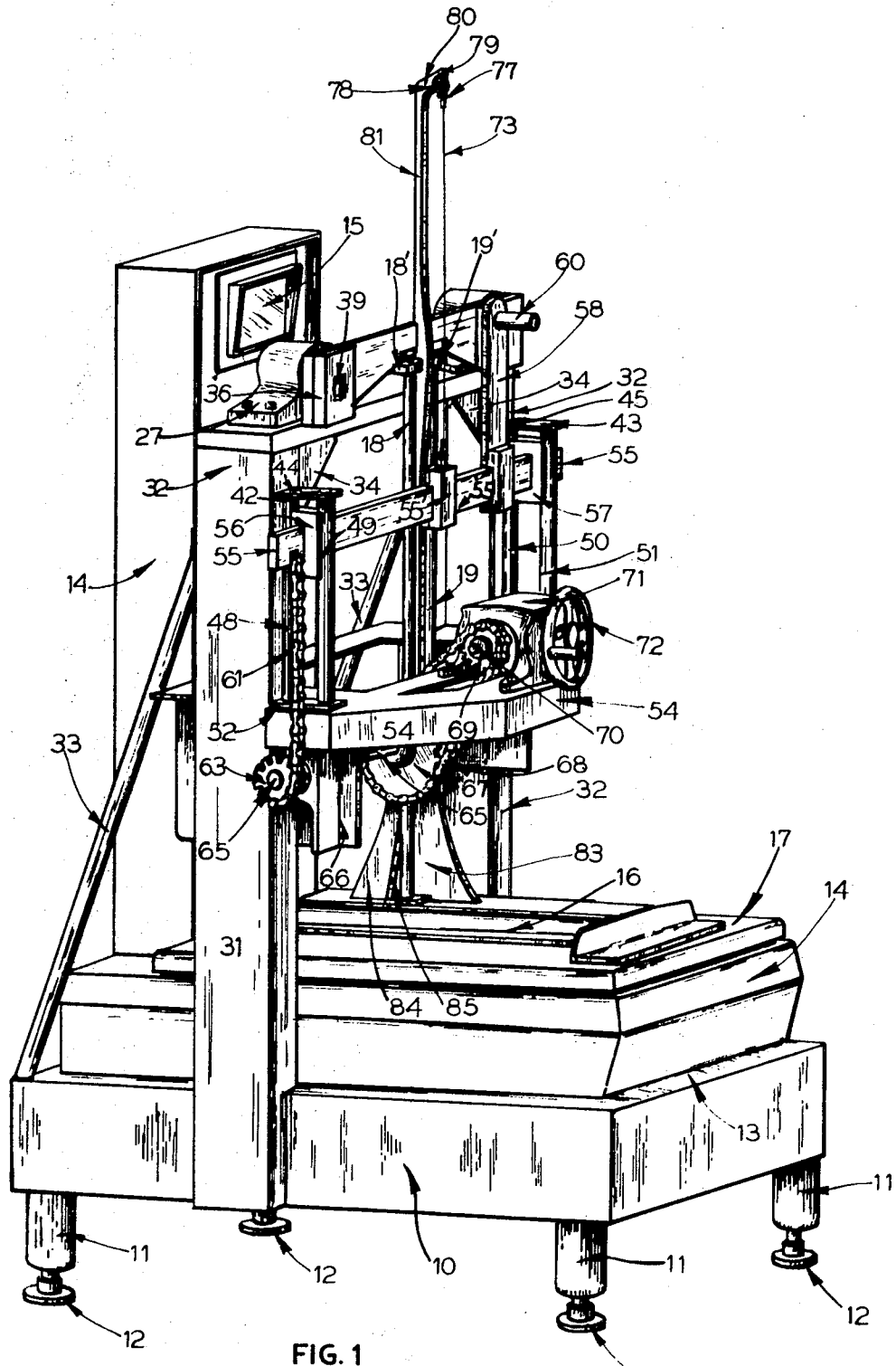

The structure selected for illustration is not intended to serve as a limitation upon the scope or teachings of the invention, but is merely illustrative thereof. There may be considerable variations and adaptations of all or part of the teachings thereof depending upon the dictates of commercial practice. The present invention comprises a base 10 which is supported by corner standards 11 which have floor levelling feet 12 to provide a flat level surface 13 on which a measuring instrumentality such as a suitable and standard platform scale 14 is mounted. The platform scale 14 should be of the type that preferably though not essentially has an enlarged illuminated viewing scale 15 and a compensating weight slide scale (not shown) to enable initial balancing of the instrumentalities to bring the scale 15 to its initial zero reading. This type of scale is conventional and known on the market.

A substantially I-shaped frame 16 is mounted on the platform 17 of the scale 14 in a balanced position thereon to receive and support adjacently disposed and parallel vertical rods 18–19 resting upon flat support shoes 20–21 fixed to substantially the center of the I-shaped frame 16 which preferably should also be the center of the weighing scale platform 17. The load transmitting rods 18–19 are each provided at their upper ends with a plate 18'–19' which in turn contact recessed balls 22 (FIG. 5) provided in the confronting extremities 23–24 of the vertical rods 18–19 and the normally horizontally disposed bracket arms 25–26 which are anchored to bearings 27 provided in brackets 28–29 supported by a cross-plate 30. The cross-plate 30 is rigidly fixed between for horizontal support on vertical channel members 31–32 which extend downwardly for fixed attachment to and support from the sides of the base 10 to provide a rigid support for the substantially rectangular rigid frame superstructure defined by the members 30–31–32–10.

This superstructure supports the instrumentalities 18–19–24–25–26–27–28–29 free of any weight or load on the platform 17 of the scale 14 or at least the load on the platform is negligible and reduced to zero by the compensating slide weight (not shown) comprising part of the standard scale 14. With this arrangement, the bracket arms 24–25 are nicely balanced in an initial horizontally aligned and confronting position for free pivotal movement so that their extremities 23–24 may descend against the vertical load transmitting rods 18–19 against which they are fulcrumed through the recessed balls 22. It should be noted that the rigid frame 30–31–32–10 is held fast against any possible movement by reinforcing inclined braces 33–34 welded or otherwise joined to the side members 31–32 of the upright frame and the sides of the base 10. Further, cross-bracing may be welded between the confronting interior faces of the uprights 31–32 to further maintain the frame upright 30–31–32–10 against any possible relative movement between the parts thereof to insure that the calibrated load will always be transmitted to the platform 17 in its entirety and without variation from time-to-time in the repeated use thereof.

As shown, the bracket arms 24–25 have reinforcing hub plates 36–37 welded or otherwise joined to the pivotal ends thereof to provide a tight connection with the bearings in the bearing brackets 27 for registry of the drive shaft end of torque wrenches 38 with complemental polygonal recesses 39–40 provided axially in the hub plates 36–37 relative to the bearings within the bearing brackets 27. This affords the loading of the bracket arm 25 or bracket arm 26 depending upon the direction in which the torque wrench is being tested or checked for either tightening or loosening of the fasteners in the normal use thereof. To this end, the torque wrenches usually are provided with a divided calibrated scale to read in either direction of nut fastening or loosening or the reverse for left-hand threads as the case may be.

In order to actuate the torque wrenches 38 to any predetermined load while the polygonal drive 41 thereof is in registry with either bracket arm recess 39 or 40, linkage is provided which will give a decided applied force advantage so that the largest torque wrenches can be manually loaded and tested or checked. To this end, vertically spaced brackets 42–43 extend forwardly from and to, of the uprights 31–32 for welded attachment as at 44–45, (FIG. 1) to support vertical aligned and horizontally spaced guide tubes 48–49 and 50–51 (FIGS. 1 and 4) which depend therefrom for connection at their bottom to the plates 52–53 attached to a horizontally disposed rigid shelf 54. The rigid shelf 54 is positioned above the scale platform 17 for fixed mounting against the interior sides and front of the vertical uprights 31–32.

A horizontally disposed bar 55 rides up and down in the aligned vertical guide plates 56–57 slidable between the guide tubes 48–49 and 50–51 to operate a vertically disposed connecting rod 58 having a guide bracket 59 at its lower end to serve as a slide over the horizontal bar 55. The connecting rod 58 carries a forwardly projecting stud 60 which is in the path of the handle 38′ of the torque wrench 38 (FIG. 2) as it is horizontally disposed with its drive shaft 41 in registry with either the bracket arm recess 39 or 40. To this end, the connecting rod 58 with its stud 60 can be displaced laterally along the bar 55 and vertically between the guide tubes 48–49 and 50–51 so that engagement of the connecting rod stud 60 with the handle 38′ of the wrench can always be effected from above of and to exert a force downwardly against the wrench handle 38′ which in turn will actuate the bracket arm 24 or 25 depending upon the direction of the test and the bracket arm recess 39 or 40 which is engaged. The connecting rod 58 with its stud 60 can be adjusted to engage the torque wrench handle in either position on the bracket arm 24 or 25.

It should be noted that the ends of the horizontal guide bar 55 are operatively connected to heavy depending chains 61–62 anchored thereto at their upper ends. The lower ends of the chains 61–62 are anchored to gear pinion 63–64 fixedly mounted to the ends of a cross-shaft 65 journalled for rotation in the shelf bracket depending bearing frame 66. The shaft 65 carries a sprocket wheel 67 to mesh with a chain 68 that connects to a pinion 69 carried by a stud shaft 70 comprising part of a reduction gear housing 71. The reduction gear housing 71 is, in this instance, of a 40 to 1 ratio of standard construction which is supported on the bracket shelf 54 for operation in the usual manner through the manual rotation of a crank arm wheel 72 which will easily pull the connecting rod 58 with its stud 61 downwardly to flex the torque wrench 38 (FIG. 2) and impress any desired load thereon to make a comparison between the reading on its dial and that of the weighing scale 14–15. This comparison will determine at a glance if the wrench is properly calibrated and accurate at a range of loads impressed by the instrumentalities 58, 60, 71, and 72 which is easily within the manual capabilities of the attendant.

In order to measure the tension in steel ropes and the like such as the steel rope 73, the horizontal loading bar 55 is slidably fitted with a sectional bracket 55′ to which a C hook is anchored through its top edge 75 for detachable engagement with a complemental C hook 76 anchored to one end of the steel rope 73. The other or top end of the steel rope 73 to be tested is also provided with a C hook 77 that engages a ring 78 mounted in an aperture 79 provided in the horizontally offset end arm 80. The arm 80 is part of a long vertical standard 81 extending substantially above and between the side load transmitting arms 25–26 for support on the I-beam 16 positioned on the scale platform 17. Thus, the range of utility for such testing devices is expanded to provide for tensile as well as compressive and torque load measuring devices.

The vertical standard 81 extends downwardly to a midregion having an outwardly curved section 82 to provide a stronger compression load factor than possessed by the comparatively narrower upper section thereabove, and the bottom thereof flares outwardly in furcated base sections 83–84 extending in the longitudinal direction of the I-beam 16.

Lateral extending and outwardly flared base sections 85–86 are welded or otherwise joined to the base sectons 83–84 symmetrically arranged therewith to provide a stable flared base quadrant 83–84–85–86 that supports the elongated standard 81. These are preferably disposed between and adjacent the edges of the flat support shoes 20–21 fixed to the I-beam 16. The I-beam 16 supports the load transmitting rods 18–19 and the standard 81 which may be welded at its flaring base sections 83–84 and 85–86 to the support shoes 20–21, and the latter, in turn, to the I-beam 16.

Thus, applying a torque wrench 38 so that its polygonal drive 41 registers with one or the other complemental recess 39 or 40 in the bearing plate 36 or 37, respectively, will cause the wrench 38 to be loaded to a value simultaneously registering on the scale platform 17 and the dial of the wrench 38. This is one function for testing torque wrenches without involving the tensile test accessory means. A further function of the test instrumentalities in tensile testing, is accomplished however, by tensioning the steel rope 73 after being fitted with "C" hooks 74–77, and utilizing these for detachable engagement with the confronting open eye hook 74 and the ring 79 (FIG. 3); rope 73 when laced operatively with a tensiometer 87 (FIG. 6) of standard or known design, so that the tensiometer reading can be checked and, further, the tensile loading characteristics of any particular steel rope and its breaking load can be determined without using the tensiometer 87 and the torque wrench 38–38′ test applications. These measuring devices are used only to test and check their accuracy in relation to the calibrated viewing dial 15 of the platform scale 14. With this arrangement, the reading on the tensiometer should be the same as the reading on the platform viewing scale 15 and the dial on the torque wrench 38 if all these measuring instruments are accurately performing their functions.

Of course, the steel rope 73 can be tensioned and tested without the torque wrench 38, since the loading bar 55 with its slide 55′ directly loads the steel rope 73, the tensiometer 87 will register the tension load therein while the platform viewing scale 15 will reflect a comparison to determine if the tensiometer is accurately adjusted. Another alternative is to directly read the tension exerted on the steel rope 73 by manipulating the manual load applying wheel 72 and reading the tension in foot pounds on the viewing scale 15.

It will be apparent that with this arrangement of parts, a comparatively simple and inexpensive testing and checking device has been provided for torque wrenches of the calibrated dial measuring type and also to measure the tension exerted on a steel rope or to arrive at the latter's rupture limit, and to insure their accuracy and proper adjustment at all times with and without the aid of tensiometer 87 laced into the steel rope 73. It should be noted that the movable bracket 55′ on the vertically slidable plate 55, may be rendered inoperative for measuring the tension in the steel rope 87 by removing or disengaging the C hook 76 from its complemental C hook 74, and utilizing the mechanism merely to re-calibrate or test a measuring instrument such as the torque wrench 38. The tension in the steel rope 73 may be measured independently of a simultaneous comparative reading of a torque wrench 38 which may be detached from the confronting arms 25 or 26, and a tension load impressed directly upon the steel rope 73 by loading increments through the manual operation of the reduction gear unit 72. This load will be impressed by the downward displacement of the horizontal bar 55, through the flexible linkage such as the chains 61–62 as schematically illustrated in FIG. 3.

While I have illustrated and described a preferred embodiment of my invention, it must be understood that my invention is capable of considerable variation and modification without departing from the spirit of the invention. I, therefore, do not wish to be limited to the precise details of construction set forth, but desire to avail myself of such variations and modifications as come within the scope of the appended claims.

I claim:

1. A self-contained torque measuring and testing mechanism comprising a frame, a standard weight or pressure responsive element as part of a measuring instrumentality positioned on said frame to function independently thereof, said weight measuring instrumentality having a calibrated dial capable of ready viewing, confronting arms serving as fulcrum plates extending from said frame and movable in a plane normal to the weight or pressure responsive element of said measuring instrumentality, an elongated plate slidably mounted on said frame normal to said weight or pressure responsive element, a reduction gear unit mounted on said frame to manually rotate a sprocket, flexible chain means operatively connected between said plate and the sprocket of said reduction gear unit, an elongated standard supported by said weight or pressure responsive element between said confronting arms and said elongated slidable plate to render said weight or pressure responsive element operative therewith, another movable member on said slidable plate, and a steel detachably connected between the free end of said elongated standard and said last named movable member to measure in increments the tension load thereon, whereby a calibrated measuring device may be detachably connected between said movable elements and said reduction gear unit for impressing increment forces therewith for direct comparison of increment readings on said calibrated measuring device and/or the calibrated dial of said weight measuring instrumentality.

2. A mechanism defined in claim 1 wherein an elongated vertical standard is mounted on said weighing platform between said confronting arms, and a steel rope is detachably connected between the upper free end of said vertical standard and said slide plate to impress a tensile load thereon.

3. A mechanism defined in claim 2 wherein the torque measuring device and the steel rope may be detachably associated with said fulcrum plates and elongated vertical standard, respectively, to test both simultaneously or invidually.

4. A torque wrench measuring and testing mechanism defined in claim 2 wherein the movable elongated plate member has a slidable bracket to enable the detachable connection of a steel rope between the upper end of the vertical standard and said slidable bracket on said movable plate to test the loading and breaking characteristics thereof.

References Cited

UNITED STATES PATENTS

| | | | |
|---|---|---|---|
| 3,255,624 | 6/1966 | Larson | 73—1 |
| 2,705,416 | 4/1955 | Thomas | 73—1 |

S. CLEMENT SWISHER, Primary Examiner